United States Patent [19]

Schweickart et al.

[11] 4,213,336
[45] Jul. 22, 1980

[54] DEVICE FOR MEASURING FLOW OF WEAK CELL LIQUOR

[75] Inventors: Albert J. Schweickart, Southgate; Thomas F. Mooney, III, Dearborn, both of Mich.

[73] Assignee: BASF Wyandotte Corporation, Wyandotte, Mich.

[21] Appl. No.: 754,289

[22] Filed: Dec. 27, 1976

[51] Int. Cl.² ............................................. G01F 1/20
[52] U.S. Cl. ..................................... 73/215; 204/275
[58] Field of Search .................. 73/215, 216; 204/195, 204/275

[56] References Cited

U.S. PATENT DOCUMENTS

| | | | |
|---|---|---|---|
| 1,042,097 | 10/1912 | Englebright | 73/215 |
| 1,067,491 | 7/1913 | Simmance et al. | 73/215 |
| 2,165,705 | 7/1939 | Houser | 73/215 |
| 2,473,765 | 6/1949 | Platts | 73/215 |
| 3,527,251 | 9/1970 | Hagstrom et al. | 73/215 |
| 3,871,230 | 3/1975 | Dye | 73/215 |

*Primary Examiner*—Herbert Goldstein
*Attorney, Agent, or Firm*—Joseph D. Michaels; Bernhard R. Swick

[57] ABSTRACT

The flow rate of weak cell liquor is determined, using a device in the form of a small box having in one wall thereof a properly sized orifice, a vertically extending slot thereabove, and a rule placed alongside the slot to make it possible to read the flow rate. A cooperating member is provided to catch the liquid passing through the device and disperse it into a plurality of small droplets while feeding it to a trough by which the weak cell liquor is collected.

4 Claims, 8 Drawing Figures

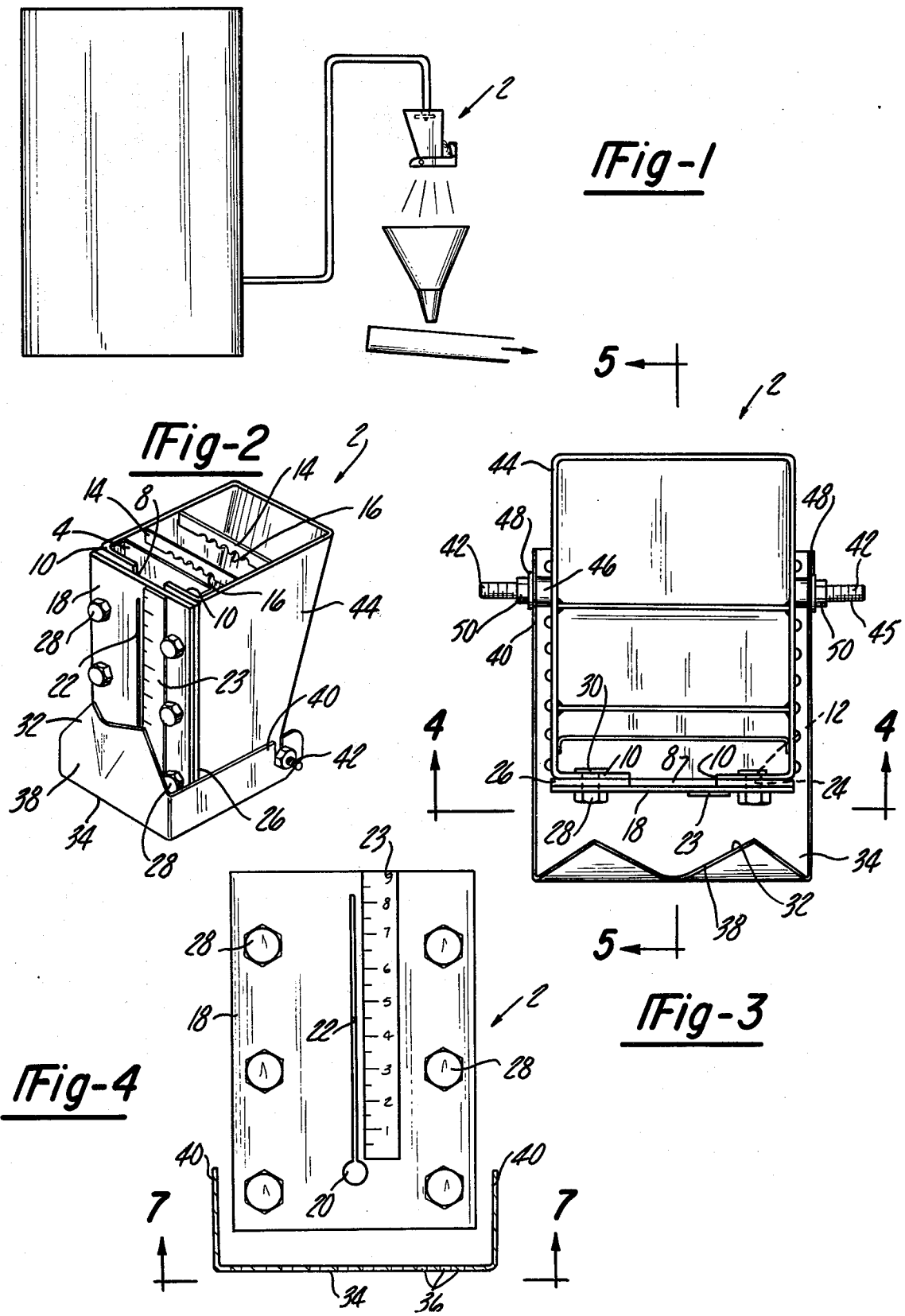

DEVICE FOR MEASURING FLOW OF WEAK CELL LIQUOR

BACKGROUND OF THE INVENTION

1. Field of the Invention

This invention relates to the measurement of the flow rate of weak cell liquor produced in a chlor-alkali cell. It further concerns the use of a weir-type flow meter for the purpose indicated.

2. Description of the Prior Art

In the operation of a cell room containing a plurality of chlor-alkali cells, it has not been usual to determine, regularly and with accuracy, the rate of production of weak cell liquor from an individual cell. When such a determination has been made, it has been usual to use merely a bucket and stop watch. Such a practice is inconvenient and somewhat dangerous, in that it involves the handling of a hot (approximately 90° Centigrade) solution of caustic.

The rate of production of weak cell liquor from an individual cell gives an important indication of how well or poorly an individual cell is currently performing. In one kind of commercial cells of the diaphragm type, the flow rate of weak cell liquor being withdrawn from the cell may range from about two to seven liters per minute. In other cells, the range may be somewhat different. Typically, a cell which has recently been renewed by having its diaphragm replaced will give a flow rate on the higher end of the range mentioned above, and as the cell operates for several weeks or months, the observed flow rate tends to decrease. From time to time, it is possible, in the operation of a diaphragm-type cell, to adjust (increase slightly) the level of the head on the anolyte side of the cell and thereby increase the flow rate. Ultimately, however, because of the buildup of a gel or of insoluble particles of alkaline-earth hydroxides which are formed because of alkaline-earth metal ions contained as an impurity in the brine fed to the cell, the rate of flow through the diaphragm decreases, even when the maximum available head is used, to a value such that further operation becomes uneconomical. In order to keep a cell room containing a great number of such individual cells operating on a smooth and satisfactory basis, it would be highly desirable to have a convenient means whereby the rate of flow of weak cell liquor leaving each individual cell could be easily and conveniently determined.

SUMMARY OF THE INVENTION

A small, convenient device is provided to make it possible to measure quickly the rate at which dilute caustic solution is being produced by an individual cell in a chlor-alkali cell room. Essentially, the device is a weir-type meter for determining liquid flow in the form of a small box with a properly sized orifice and vertically extending slot thereabove, a rule placed alongside the slot to make it possible to read the flow rate, and a cooperating member below and in front of the box to catch the liquid passing through the device and disperse it into a plurality of small droplets while feeding it to a trough by which the dilute caustic is collected.

DESCRIPTION OF THE DRAWINGS

A complete understanding of the invention may be obtained from the foregoing and following description thereof, taken in conjunction with the appended drawings in which:

FIG. 1 is a schematic view in elevation of the environment in which the catch device of the present invention is used;

FIG. 2 is a perspective view of a preferred embodiment of the invention;

FIG. 3 is a top plan view of the same preferred embodiment of the invention shown in FIG. 2;

FIG. 4 is a sectional view taken on the line 4—4 of FIG. 3;

DESCRIPTION OF THE PREFERRED EMBODIMENTS

Figure 5:
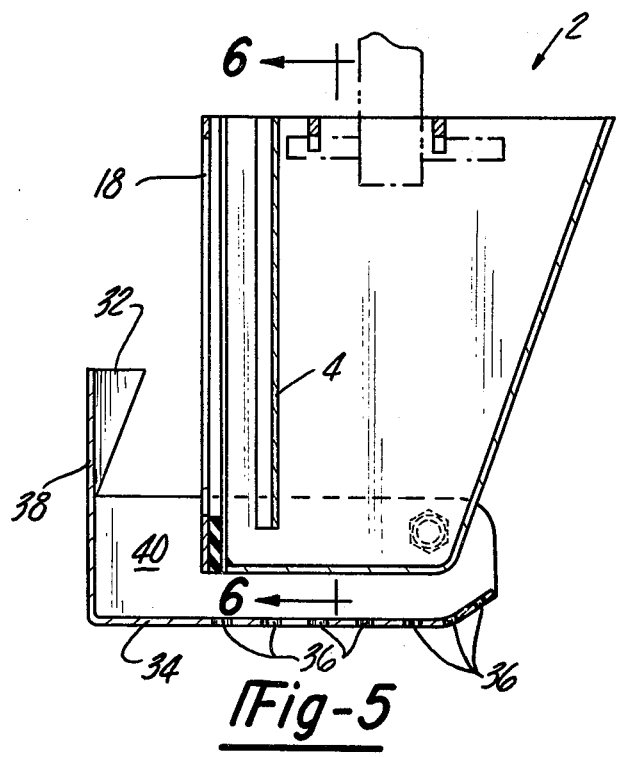
FIG. 5 is a sectional view taken on the line 5—5 of FIG. 3.
Figure 6:
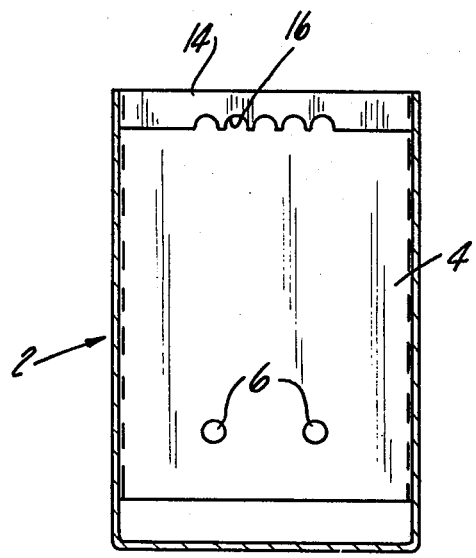
FIG. 6 is a sectional view taken on the line 6—6 of FIG. 5.
Figure 7:
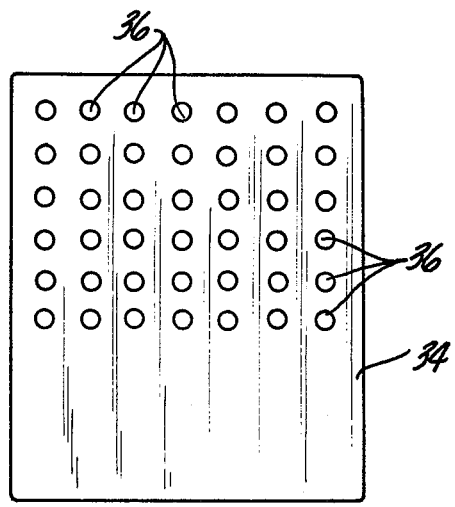
FIG. 7 is a bottom view taken on the line 7—7 of FIG. 4.

As is shown in the drawings, in one embodiment of the present invention there is provided a box 2, which may be made of thin-gauged sheet steel or other suitable material. Affixed within the box 2 is a turbulence plate 4 having therein openings 6 which serve to permit the passage therethrough of the liquid being metered. The box 2 has an open front side 8 with flanges 10, having therein openings 12.

Attached to the sides of the box 2 and near to its top, there are provided a pair of band-like members 14, the bottom surfaces of which are provided, as shown, with a number of serrations 16.

The device further comprises a plate 18, which may be made of some material suitably resistant to the action of hot caustic, such as stainless steel or titanium. The plate 18 contains, centrally located within its lower end, an orifice 20, and extending vertically and communicating with the orifice 20, there is a slot 22 of predetermined size and length. Desirably, the slot is so positioned that its length, if extended, passes through the center of the orifice 20. Mounted alongside the slot 22 is a rule 23, which should have divisions at suitably close intervals, such as about every 2 millimeters or closer. A plurality of holes 24 are provided in the plate 18 at locations which register generally with the openings 12 in the flanges 10. Preferably, however, the holes 24 are slightly larger in diameter than the opening 12. This makes it possible to adjust to some small extent the position of the plate 18 with respect to the box 2.

The device further comprises strips of gasketing 26 having openings therein which permit the plate 18 to be secured to the flanges 10 by means of bolts 28 and nuts 30.

In the embodiment of the invention being described, there is further provided a means 32 for deflecting a flow of liquid passing through the orifice 20. The means 32 further serves to divide the liquid being metered into a plurality of small streams, which disperse into droplets as they fall into the collector basin. Thus, the means 32 comprises a generally flat bottom portion 34, which has therein a plurality of small openings 36. It has a front portion 38 which is of sufficient height to serve as a deflector plate, and it has side portions 40, by means of which it may be engaged and mounted, preferably pivotally, with means 42 projecting from the sides 44 of the box 2. As shown, the means 42 may comprise a bolt 45, the head 46 of which is tack-welded to side of the box 2, a suitable connection being made by means of washers 48 (surrounding the side portions 40 of the means 32) and nuts 50.

Method of Operation

The interior of the box is provided with a quantity of packing of suitable material (not shown). Raschig rings berl saddles, or other material suitably resistant to the action of hot aqueous caustic may be used.

The device 2 is mounted suitably at the discharge end of a perk arm (not shown) of an individual cell. Usually, the perk arm is provided at its discharge end with a pair of small rods or arms, which are used to mount, between the discharge ends of the perk arm and the collector basin that leads the weak cell liquor to the collection trough, a dripper device which serves to break the discharge stream up into a plurality of fine streams and droplets and thereby minimize the leakage current of the individual cell involved. It will be appreciated that the above-described embodiment of the invention is adapted to serve the purposes of the dripper device. The serrations 16 are caused to engage the above-mentioned arms or rods on the discharge end of the perk arm.

With the proper operation of the device, it is desirable that it be mounted in such a manner that it sits substantially level, so that a line through the center of the slot 22 is substantially plumb, not canted to the right or the left when viewed from the front, nor when viewed from the side. It is desirable to provide a device which may be conveniently brought into a proper operating position, i.e., in effect, leveled.

The location of the discharge of the perk arm with respect to the collector basin below it varies from one individual cell to another. This is because the inward end of the perk arm is connected to the cell through a threaded connection, which is usually initially made as tight as possible, but tends to become looser, to a greater or lesser extent, as the cell is brought up to operating temperature. Thus, different ones of the serrations 16 may be used in a given case so as to make the device hang properly. The adjustability afforded by the pivotable connection between the means 32 and the box 2 serves a similar purpose.

Within a short period of time, such as one minute or less after the device has been mounted on the perk arm, a steady flow rate through the device has usually been established. With a device having an interior capacity on the order of 200 to 400 milliliters, metering a flow rate from the order of two to seven liters per minute, the time required to achieve a steady flow is quite short.

Those skilled in the art will readily see that it is desirable to provide an orifice 20 which is of such size as to account for some substantial portion of the flow which is to be metered. Satisfactory results have been obtained with the use of an orifice 9/32 inch (7.14 millimeters) in diameter and a slot 3/64 inch (1.09 millimeters) wide and about 80 millimeters long. It can be said that in accordance with the present invention there are provided an orifice and a slot of such dimensions that, ideally, the orifice is large enough to pass substantially all of the weak cell liquor when the flow is at some minimal expected value, and the slot is of such dimensions that it exhibits both adequate sensitivity and adequate range. In dealing with the problem of metering a flow of from 2 to 7 liters per minute, it is desirable to have a difference in flow of 1 liter per minute correspond to a difference of at least 4 or 5 millimeters, and preferably 7 to 10 or more. There is, on the other hand, the consideration that although the sensitivity and/or the range may be increased by using a longer slot, the space between the perk arm and the weak-cell-liquor collector basis is somewhat limited, so that ordinarily the entire device cannot be more than about 160 millimeters high. Within the foregoing guidelines, the invention is defined as one in which the dimensions of the orifice and the slot are such as to permit flows in the range of 3 to 7 liters per minute to be read with a sensitivity corresponding to changes of 4 to 10 millimeters per change of 1 liter per minute in the flow rate being metered.

It has been found that the slot 22 will give a different reading if its front is dry rather than wet. Accordingly, before taking a reading, it is customary to pass the gloved hand of the operator upwardly along the length of the slot and then take a reading.

The front portion 38 of the means 32 serves to deflect the stream of weak cell liquor passing through the orifice 20 and prevent it from striking the operator or being spilled into the aisle of the cell room.

It has been found that with the use of such a device, after proper calibration, satisfactory readings, accurate to within about ½ percent of the true value of the flow rate, as measured by the method of using a bucket and stop watch, can conveniently be obtained.

Modifications and Equivalents

Figure 8:
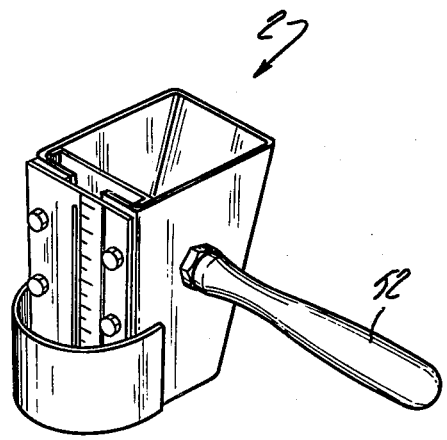
FIG. 8 is a perspective view of an alternative embodiment of the invention, showing an additional but optional feature.

Those skilled in the art will perceive that a similar device, particularly useful for going from one cell to another and taking readings upon a series of cells, may be made by omitting the feature of the bands 14 with their serrations 16 and instead, providing the box 2 with a handle having at least one portion of low heat conductivity, or using suitable tongs to hold it properly in place. Since the device is made of steel and must contain weak cell liquor at a temperature on the order of 85° to 95° Centigrade, it is impractical to expect an operator to hold the device in his gloved hand for a period of time such as one minute; other support means, such as a suitable cart, could likewise be provided. Such a device is depicted in FIG. 8, which shows a handle 52.

In place of a rule, other suitable indicia may obviously be provided.

Moreover, the function of dividing the stream of caustic into droplets to minimize leakage current is not to be considered absolutely essential. For the length of time that it takes to obtain a reading, this function can be dispensed with. It is certainly necessary, however, to provide some means (such as the portion 38 mentioned above) to deflect the stream of weak cell liquor issuing from the orifice 20. Those skilled in the art will readily see how that may be done without providing the pivotally connected base member 32.

While we have shown and described herein certain embodiments of our invention, we intend to cover as well any change or modification therein that may be made without departing from its spirit and scope.

The embodiments of the invention in which an exclusive property or privilege is claimed are defined as follows:

1. A device for measuring the rate of flow of weak cell liquor being discharged from a perk arm of a chloralkali cell, said device comprising, in combination, an open-topped box means having side walls, a backwall and a front portion, a plate means having therein an orifice and a vertically extending slot above said orifice, said plate means having thereon and extending alongside said slot indicia adapted to identify the locations along the length of said slot, the dimensions of said orifice and said slot being such as to permit flows in the range of 3 to 7 liters per minute to be read with a sensitivity corresponding to changes of 4 to 10 milliliters per change of one liter per minute in the flow rate being metered, means sealingly securing said plate means to said front portion of said box means, and deflector means operatively associated with said box means to deflect liquid issuing from said orifice, wherein said box means further has means for mounting said box to a discharge end of a perk arm of a chlor-alkali cell, wherein said means for mounting said box means comprises a spaced pair of band-like members, each of said band-like members having upon its lower side a plurality of serrations, said band-like members extending from one to another of the side walls of said box means in the vicinity of the top thereof.

2. A device as defined in claim 1, wherein said deflector means comprises a shaped sheet-like member having front, bottom, and side portions, said front portion serving to deflect weak cell liquor issuing through said orifice, said bottom portion serving to divide weak cell liquor passing through the device into a plurality of fine streams, and said side portions serving to connect said deflector means pivotally to said box means.

3. A device for measuring the rate of flow of weak cell liquor being discharged from a perk arm of a chlor-alkali cell, said device comprising, in combination, an open-topped box means having side walls, a backwall and a front portion, a plate means having therein an orifice and a vertically extending slot above said orifice, said plate means having thereon and extending alongside said slot indicia adapted to identify the locations along the length of said slot, the dimensions of said orifice and said slot being such as to permit flows in the range of 3 to 7 liters per minute to be read with a sensitivity corresponding to changes of 4 to 10 milliliters per change of one liter per minute in the flow rate being metered, means sealingly securing said plate means to said front portion of said box means, deflector means operatively associated with said box means to deflect liquid issuing from said orifice, wherein said deflector means comprises a shaped sheet-like member having front, bottom, and side portions, said front portion serving to deflect weak cell liquor issuing through said orifice, said bottom portion serving to divide weak cell liquor passing through the device into a plurality of fine streams, and said side portions serving to connect said deflector means pivotally to said box means.

4. In a device for measuring the flow of weak cell liquor issuing from a perk arm of a chlor-alkali cell, the combination comprising, generally box-like weir-type flow-meter means for detecting a flow rate of 3 to 7 liters per minute with a sensitivity of 4 to 10 millimeters of change in head per one liter per minute of difference in flow rate, deflector means cooperating with said flow-meter means to protect an operator from the action of weak cell liquor passing through said flow-meter means, and means for supporting said flow-meter means in an operative position in spaced relationship to a discharge end of said perk arm, said means for supporting said flow-meter means in an operative position being means supporting said flow-meter means in dependent relation from said perk arm and including a spaced pair of band-like members, each of said band-like members having upon its lower side a plurality of serrations, said band-like members extending from one to another of the side walls of said box-like flow-meter means in the vicinity of the top thereof, said deflector means comprising a shaped sheet-like member having front, bottom, and side portions, said front portion serving to deflect weak cell liquor issuing through said orifice, said bottom portion serving to divide weak cell liquor passing through the device into a plurality of fine streams, and said side portions serving to connect said deflector means pivotally to said box means, said combination further being such that said deflector means are mounted to said box means for pivotal movement with respect thereto, whereby said device may be leveled.

* * * * *